(12) United States Patent
De La Fuente Munoz

(10) Patent No.: US 9,993,781 B2
(45) Date of Patent: Jun. 12, 2018

(54) SYSTEM FOR THE PROCESSING OF ORGANIC WASTE AND PRODUCTS

(71) Applicant: SUSTANE TECHNOLOGIES INC., Halifax (CA)

(72) Inventor: Javier De La Fuente Munoz, Murcia (ES)

(73) Assignee: SUSTANE TECHNOLOGIES INC., Halifax (CA)

( * ) Notice: Subject to any disclaimer, the term of this patent is extended or adjusted under 35 U.S.C. 154(b) by 625 days.

(21) Appl. No.: 14/055,138

(22) Filed: Oct. 16, 2013

(65) Prior Publication Data

US 2015/0043305 A1 Feb. 12, 2015

(30) Foreign Application Priority Data

Aug. 9, 2013 (EP) .................................. 133822323

(51) Int. Cl.
| | |
|---|---|
| *B01F 7/00* | (2006.01) |
| *B01F 3/06* | (2006.01) |
| *F23G 5/04* | (2006.01) |
| *B09B 3/00* | (2006.01) |
| *B01F 13/10* | (2006.01) |

(52) U.S. Cl.
CPC .......... *B01F 7/00425* (2013.01); *B01F 3/068* (2013.01); *B01F 7/0065* (2013.01); *B01F 7/00141* (2013.01); *B01F 13/1016* (2013.01); *B09B 3/0091* (2013.01); *F23G 5/04* (2013.01); *B01F 2215/0042* (2013.01); *F23G 2203/8013* (2013.01)

(58) Field of Classification Search
CPC ........... B01F 7/0065; B01F 2215/0042; B09B 3/0091; F23G 5/04; A61L 2/07; C10B 7/10; C10B 47/44; B02C 18/0084
USPC .............................. 422/26, 32; 366/319–322
See application file for complete search history.

(56) References Cited

U.S. PATENT DOCUMENTS

| | | | | | |
|---|---|---|---|---|---|
| 1,861,721 | A | * | 6/1932 | Murray .................... | A01J 27/04 366/103 |
| 3,616,266 | A | * | 10/1971 | Hall .......................... | C10B 7/10 201/12 |
| 4,618,735 | A | * | 10/1986 | Bridle ...................... | C02F 11/10 201/2.5 |
| 5,360,553 | A | * | 11/1994 | Baskis ..................... | B01J 6/008 201/25 |
| 5,866,201 | A | * | 2/1999 | Blue ......................... | B01F 3/14 222/235 |
| 7,384,181 | B1 | * | 6/2008 | Collette .............. | E01C 19/1004 366/147 |
| 7,993,048 | B1 | * | 8/2011 | Collette .............. | E01C 19/1031 366/147 |

(Continued)

*Primary Examiner* — Tony G Soohoo
*Assistant Examiner* — Elizabeth Insler
(74) *Attorney, Agent, or Firm* — Maier & Maier, PLLC

(57) ABSTRACT

System for the processing of organic waste and products, which is equipped with, at least, one cylindrical cavity of treatment which is arranged with a loading area and a unloading area of waste and an entrance and exit of vapor. Inside the cylindrical cavity, a dragging spindle with direction of advance from the loading area to the unloading area is installed. The axis of the dragging spindle is equipped with mixing blades which conform a mixing spindle with a direction of advance opposite to that one of the dragging spindle.

4 Claims, 4 Drawing Sheets

(56) References Cited

U.S. PATENT DOCUMENTS

2003/0147771 A1\* 8/2003 Hodgins .................. A61L 2/07
 422/26

\* cited by examiner

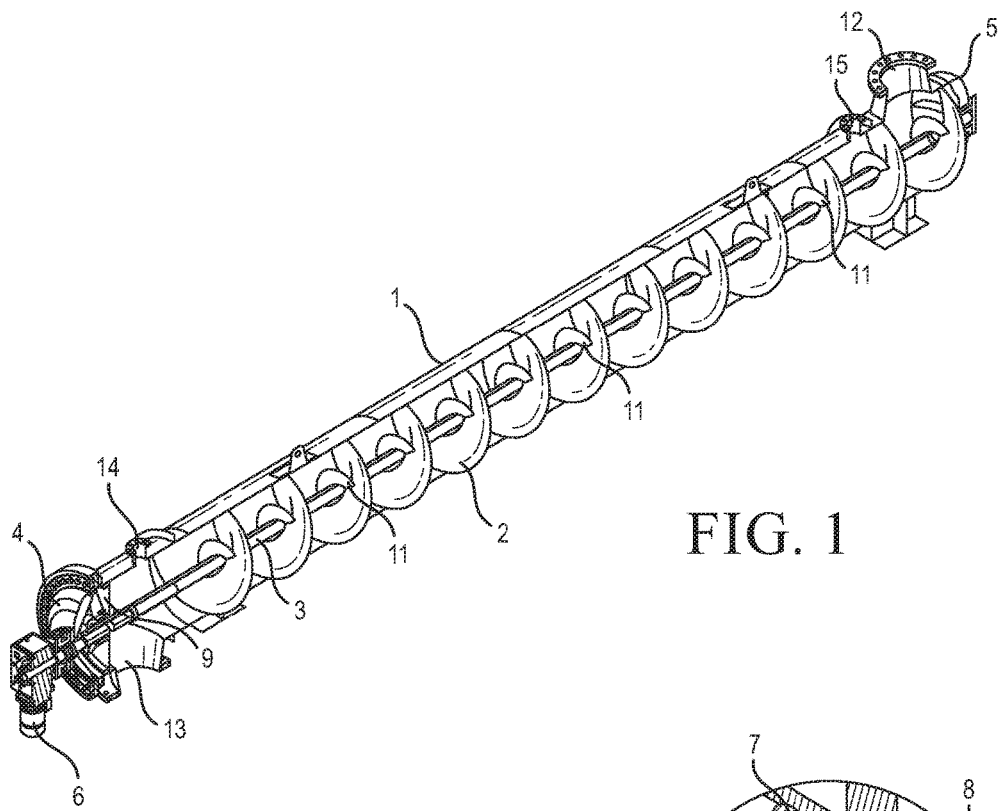
FIG. 1
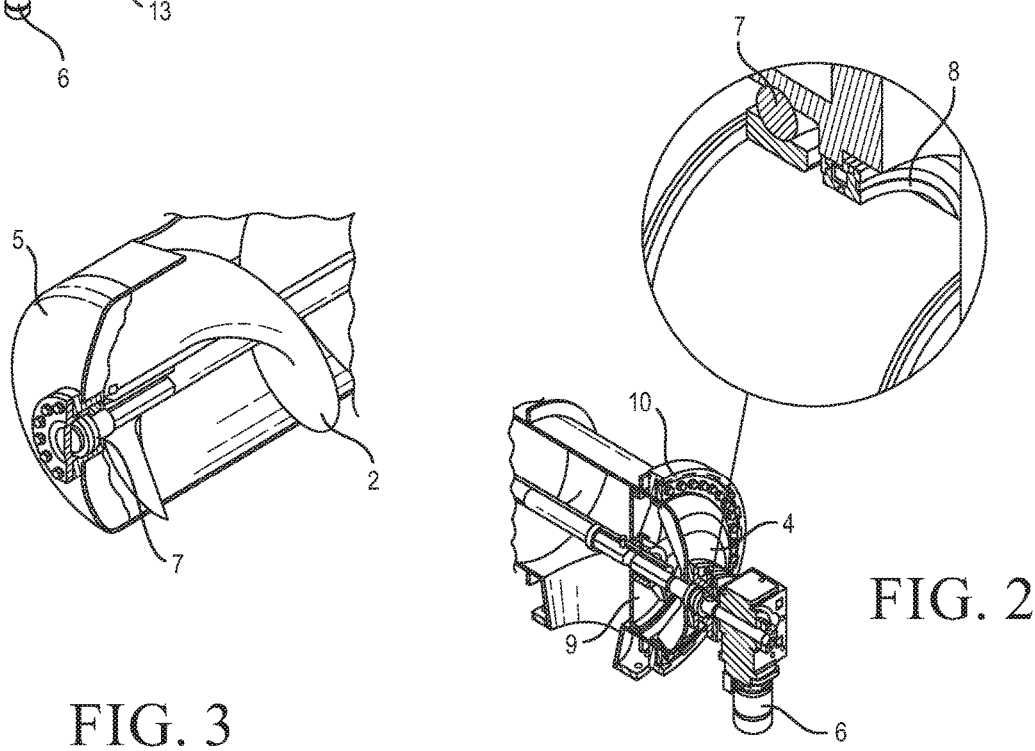
FIG. 3
FIG. 2

SYSTEM FOR THE PROCESSING OF ORGANIC WASTE AND PRODUCTS

CROSS-REFERENCE TO RELATED APPLICATION

This application Maims the priority of European Patent Application Serial No. 133822323-7 filed on Aug. 9, 2013, the contents of which are incorporated herein by reference in its entirety.

FIELD OF THE INVENTION

The present invention refers to a system for the processing of organic waste and products of organic nature, such as urban solid waste, therapeutic muds, eating products destined to human consumption such as peppers, mussels, etc. by means of its sterilization and transformation of its morphology with saturated water vapour.

Almost two centuries ago, the agents responsible for infectious diseases were found. Such a discovery triggered the use of safety measures when consuming eating products or sterilizing house or hospital utensils. With the passing of time, this discovery is trying to be applied nowadays to other products such as the urban solid waste, the therapeutic muds, etc., safety measures known as "sterilization" and it is the destruction or complete elimination of all sorts of contaminating microorganisms in the products which are being treated.

SUMMARY OF THE INVENTION

The system of the invention uses the saturated water vapour as manager of the internal process, given the fact that water vapour constitutes a versatile and flexible tool for industry and it is relatively cheap and of easy access in most of the countries. Its temperature can be adjusted with high precision taking control of the pressure with the use of valves; it transports relatively important quantities of energy with little volume and, when it becomes water again, it cedes notable amounts of energy.

The system of the invention is controlled by an automat which selects the ideal pressure of the water vapour in order to change the morphology of the product, at the same time that it sterilizes it, for products such as urban solid waste, therapeutic muds, eating products, etc. so that, in this way, they can be treated as non-contaminating and not dangerous products and classified for its reutilization and integration again in the productive chain. In the case of eating products, this sterilization gives guarantees of being apt for human consumption.

BACKGROUND OF THE INVENTION

Systems and methods of treating organic materials are ready known, the following documents can be cited as antecedents: U.S. Pat. No. 5,427,650; WO03026101; WO2007/079968; WO2008/065002; WO2008/010854; U.S. Pat. No. 7,303,160; U.S. Pat. No. 5,091,158; WO03/025101; EP087433; EP2009/009336; GB2452289; GB2456074.

In all cases, problems of high energy consumption, expensive maintenance and, ultimately, high costs of production are formulated. In some cases because the process which is used is complex and slow due to the high number of operations which are necessary to be done from the load to the unload of the product to be sterilized, so that the cycles of the process take unnecessarily longer time and they raise the energy consumption. In other cases because turning-over drums are used or because the container, set to pressure, of the product to be treated, is directly made to spin around its longitudinal axis; leaving in ail of these mechanisms half of the volume of the turning-over drum free of load in order to be able to do the turning-over of the product, what implies an excessive consumption of unproductive saturated vapour, which is only used as filling element in order to maintain the pressure in the containers. In other cases, because the management process is carried out by Bach instead of in continuum. Besides, all of these systems are obliged to install expensive draining systems to evacuate all of the condensed masses which are generated in the process and which do not correspond to the consumption with that heat contribution with the treated production, given the fact that half of the consumed vapour in any of the processes above mentioned is unproductive vapour and, therefore, it goes to waste or to any other application for which it was not meant.

DESCRIPTION OF THE INVENTION

The present invention consists of a system for the processing of urban solid waste and eating and organic products in general, with which the problems previously mentioned are eliminated.

According to the invention, the system consists of at least one cylindrical cavity of treatment which has a loading area for the product to be treated, situated near one of the bases of the cavity and an unloading area of the product to be treated, near the opposite base of the cavity. Besides, the cavity has an entrance for the feeding of saturated water vapour, which is situated near the loading area and an exit for vapour, situated near the unloading area.

Inside the cylindrical cavity of treatment is inserted a dragging spindle whose helix goes from the loading area to the unloading area. The axis of this dragging spindle carries, besides, mixing blades which are situated between the steps of the helix of the dragging spindle. In every step of the helix of the dragging spindle, a mixing blade can be inserted, distributing for example the mixing blades in all of the angular coinciding steps and positions.

Preferably, all of the mixing blades will present an opposite curvature to that of the helix of the dragging spindle, making together a mixing helix going in the opposite direction to that of the helix of the dragging spindle and of less diameter than that of the dragging spindle. The cylindrical cavity of treatment is equipped with external mechanisms of operation of the spindle which are situated following one of the bases or closures of the aforesaid cylindrical cavity and with mechanisms of control of the injected vapour.

Preferably, the system will consist of at least two cylindrical cavities which will be connected in series through its loading and unloading areas. Each cavity will include independent mechanisms of operation and control of the injected vapour.

Each cylindrical cavity of treatment will have, at least on the part of the mechanisms of operation of the spindle and near these mechanisms, a transverse partition wall which isolates the elements and motor components of the spindle from the space destined to the cavity of treatment.

According to another characteristic of the invention, the helix of the spindle will be of slightly less diameter than the internal one in the cylindrical cavity, so that between the periphery of the spindle and the internal surface of the cylindrical cavity, it is created a void space which will be occupied by part of the product to be treated and which is not dragged by the dragging spindle, conforming between the aforesaid spindle and the cavity wall a protecting cover which will avoid the rubbing between the helix and the wall of the cylindrical cavity.

The system can consist of a determined number of cylindrical cavities of treatment, for their adaptation to the foreseen production, including preferably a minimum of two cavities connected in series.

By means of the controlled injection of saturated vapour in each of the cylindrical cavities, the convenient pressure and temperature will be reached, for example an internal pressure over two bars and a maximum temperature of 160° C. in these conditions, in each cylindrical cavity, the product introduced through the loading area will advance along the aforesaid cavity mixing for a period of time which may vary from 20 to 30 minutes, depending on the product to be treated.

An important part of the system of the invention, above mentioned, is, that between the periphery of the spindle and the internal surface of the cavity wall, it always remains a void space which is filled with static product, not dragged by the spindle, which serves as shock-absorbing mechanism between the spindle and the cavity wall; that way, a natural protection of the cavity from corrosions by chemical agents or wearing erosions due to the advance of the product can be obtained. That is, there is no friction in the advancing process between the product and the cavity; given the fact that, the friction is produced between the shock-absorbing static product and the product in movement dragged by the spindle.

In the system of the invention, on the contrary to the already known methods, there are no compensating cavities or draining systems. All of the processed product and the condensation generated by the contribution of heat of the saturated vapour for its transformation and sterilization, is absorbed in its totality by the aforesaid product, everything coming out mixed up at the end of the line through the unloading area, avoiding in that way the production of leaching during the process.

One of the most innovating aspects of the system of the invention, and which makes it absolutely different from all other systems already existing in the market, is the low consumption of energy; that is, the low consumption of natural gas, biogas, diesel oil, etc. to generate saturated vapour; which, as already said before, is the manager, transformer and sterilizer of the internal process that is generated inside the cavities. The aforesaid low consumption is justified due to the fact that, during the process, it can be considered that the cylindrical cavities are completely full of the product to be treated in every case, approximately 96% of the total volume of the aforesaid cavities, getting to occupy practically all of the cylindrical space of the cavity; this way, at the beginning of the process, the entering vapour in the cavities would occupy only the little spaces that could remain between product and product, without leaving empty spaces between the cavity and the product, achieving in this way that that demand of entering vapour is only to raise the pressure of the cavity and, therefore, the temperature and transformation of the product; and that, at the same time, there are not any areas of unproductive vapour or bags of air, as it happens with the conventional systems which exist nowadays (the drums or rotatory cavities, which need half of the cavity free in order to turn over the product), that, besides, when these bags of vapour condense, they generate leaching that has to be depurated later, all of that without taking into account the energetic consumption to generate and depurate all of this unproductive vapour, which afterwards is lost.

In this scene of work we come across the fact that, in the system of the invention, part of the waste or product (organic material) absorbs part of the energy ceded by the vapour when it condenses; and, as no bags of unproductive vapour have been produced due to free spaces which may have generated an excess of condensation, the adequate humidity of the organic material that is part of the product is achieved; without saturating it with water from condensation of that vapour (this is the case of the urban solid waste).

Thanks to this control of humidity the organic material can be sent, once it has been processed, directly to anaerobic digesters for its use in the generation of biogas or, previously reducing the humidity until reaching an index of 15% approximately, for gasifying and generating synthesis gas.

As it is well known, air has an important influence in the efficiency of the sterilization with water vapour, given the fact that its presence modifies the relationship pressure/temperature. Besides, the existence of bags of air will avoid the right penetration of the vapour inside the product and will send erroneous signals to the automat, delaying in this way the times of the cycles in the process and obliging to collocate mechanisms for the purging of air or vacuum systems, which would raise the costs of the system trying to eliminate those bags of air. In contrast, with the system of the invention, in the moment that the feeding cavity is loaded up to 96% of the total volume, the purge of air is made by the very same filling of the product; that is, at the same time that we fill the product, we purge the air; given the fact that when the product enters the system, a displacement of that mass of air is produced, so that, when the vapour starts to enter, a sweep of the little amount of air which could remain is carried out, maximizing in this way the penetration of heat in the product to be treated. In this way, the costs of the system are significantly reduced, as there are no previous vacuum or purging-of-air mechanisms in the system, shortening the time of the cycles of treatment, with the subsequent rise of production.

A very significant aspect of the invention is the possibility to combine the cylindrical cavities in a strategic way to increase production. This is explained in the following way: when the product enters the first cavity and receives the first injection of vapour, after four minutes approximately (this depends on the pressure/temperature), a reduction of volume (not of weight) to approximately 40% is produced; when this waste or product goes through successive cavities and the process continues advancing in time, this reduction of volume increases until it comes to 60%, so that the speed of the cavities can be reduced in a progressive way and the product can remain in the cavities more or less time, depending on the morphologic transformation that is desirable to be achieved and always maintaining the filling of the cavities around that 96% that has been commented on in this treatment as one of the key points in this process; avoiding in this way to leave free spaces inside the cavities generated by that successive reduction of volume and, in this way, not making the mistake of generating bags of unproductive vapour due to an excess of free volume inside the cavities; because, after many cycles, the consumed vapour that would get lost would be considerable and, therefore, the fuel that would have been consumed to generate that vapour would also have been appreciable.

Another important aspect of this invention is that the heads of the axis that put in motion the main spindle of advance of the product (motor and conducted head), are equipped with bearings stabilized for temperatures up to 200° C. in continuum, with brass containers for the leading of the halls and air spaces bigger than the normal ones due to dilations. The closure for pressure isolation between the internal and the external part of the cavities is achieved by means of Widia-carbon mechanic closures (tungsten carbide with a load of cobalt between 6 and 10%), these closures are equipped with Perfluoroelastomero o-rings (FFKM) to avoid theft degradation by chemical agents.

An innovating aspect of the invention is the plugging of the offing of the rail bearings and support of the axis of the motor area with the external part. In the aforesaid area, there are installed a number of closing elements, which are equipped with a magnetic system of spinning which adds anti-corrosion security in the axis, given the fact that this closure spins together with the axis itself; therefore, there is no type of friction or corrosion between the axis and its closure, improving all of the conventional systems which generally use for the plugging in the axes the system of rubber retainers; given the fact that all of these elements (the rubber retainers) raise some problems of maintenance due to corrosion in the surface of the axis in the friction area, apart from having to insert an anti-corrosion piece in the aforesaid area (between the axis and the closure) so that, when corrosion appears, the piece is substituted and leaks of the fluid are avoided. All of these systems of conventional rubber retainers imply an excessive maintenance in this type of plants that exist in the market nowadays due to the aggressiveness of the products to be treated. With the use of this magnetic system of spinning in this mechanic invention, all of these inconveniences are totally solved.

Another very important characteristic that the invention incorporates is a mechanism of advance of control of the production by means of an encoder in the main axis of the spindle in the motor area so that, in this way, the necessary revolutions in each step of the process can be given and, therefore, the same production; and to maintain, this way, the perfect filling of the cavities during the process to the 96%, ensuring the low energetic consumption; given the fact that the feeding flow of the product of this system is another of the key points to accomplish the parameters of consumptions and production.

Another very beneficial aspect with respect to the conventional systems is, not only that the production and low consumption are maintained, but also that, besides, due to the maintenance of the filling to the 96% of the total volume of the cavities, the friction between product and product is achieved, as well as the cleaning of their metallic components, thanks to the fact that in each step of the main spindle it is installed a mixing blade, which ensures in this way a relative movement for the homogenization of the final product, in contrast to the conventional systems that exist in the market; systems which make the product jump or turn over in the drums or make the reactor or cavity spin around its longitudinal axis which, apart from not being effective due to not being completely full and leaving spaces for unproductive vapour, generate high maintenance costs.

Another advantage of this innovation is that all the pieces of corrosion and, therefore, of substitution are independent and isolated from the areas of treatment of the product, avoiding in this way possible breakdowns and being theft preventive maintenance very easy to do due to the fact that they are in external and accessible areas.

On the other hand, this invention is equipped with a better mechanical configuration in order to get a considerable saving in the consumption of energy. All the systems that exist nowadays make the product turn over inside the pressure containers, having to leave half of these containers or cavities free so as to make the turning over of the product to be treated, with the subsequent damage of a volume full of unproductive vapour which was mentioned before and which will be lost.

Another advantage of the invention is that all the cavities that conform the system are identical and, therefore, interchangeable; each one of them can work in any step of the process, allowing this flexibility, simplicity in the installation and substitution of any piece in an immediate way in case it is necessary, without damaging the normal operation of the plant, at the same time that there is no need to keep a big number of pieces for theft maintenance; given the fact that the substitution pieces are interchangeable among each other.

The base of the invention, where all the working system stands, has its origin in how the product is processed, product which advances positively from the feeding area of the cavities to theft exit. In each step of the dragging spindle which makes the product advance inside the cavities, a relative movement is produced within that very same step as a consequence of the mixing blades which, as the name tells, mix the product at the same time that the dragging spindle makes the aforesaid product advance with respect to the cavity, that is, with these movements the following parameters are accomplished:

$1^{st}$ Fixing to the dragging spindle of the cavity the adequate revolutions and being these revolutions controlled by an encoder for their advance, the perfect filling is achieved in each step of the dragging spindle, as well as the filling of the volume of those cavities to that 96%, maintaining in this way the ideal production.

$2^{nd}$ Maintaining that filling under total control both in the cavity and in every step of the spindle, the optimal consumption of water vapour is achieved for that volume of product, which is at that moment in process.

$3^{rd}$ With the conditions mentioned in the two previous statements, the product absorbs, by means of condensation of the vapour when ceding the heat, the adequate humidity for its transformation, without becoming saturated, as it happens with the processes and systems existing in the market and, in this way, not to generate leaching during the process.

$4^{th}$ Having humidity under control with the production and, therefore, the consumption of vapour, the cavities do not need draining systems for the leaching, given the fact that this is not generated during the process; therefore the inconveniencies derived from having to install draining systems, valves, conducting pipes and decompression pipes, are avoided; at the same time, the fall of pressure in the cavities at the moment when they are draining, with the subsequent consumption of energy and the sending of signals of control to the automat to activate and deactivate valves, is avoided.

$5^{th}$ in contrast to the systems which exist nowadays in the market, the system of the invention has no internal mechanism inside the cavity, attenuating and lengthening the preventive maintenance.

BRIEF DESCRIPTION OF THE DRAWINGS

In the enclosed drawings, an unrestrictive realization example of a system for the processing of solid waste and organic products is shown. In the drawings:

FIG. 1 shows in perspective and diametrically cut off a cylindrical cavity of treatment, constitutive of the system of the invention.

FIG. 2 shows in perspective and in more detail the motor area of the cavity in FIG. 1, with detail of the plugging mechanism.

FIG. 3 shows a view similar to the one in FIG. 2 of the conducted area of the cylindrical cavity in FIG. 1.

DETAILED DESCRIPTION OF THE INVENTION

Figure 4:
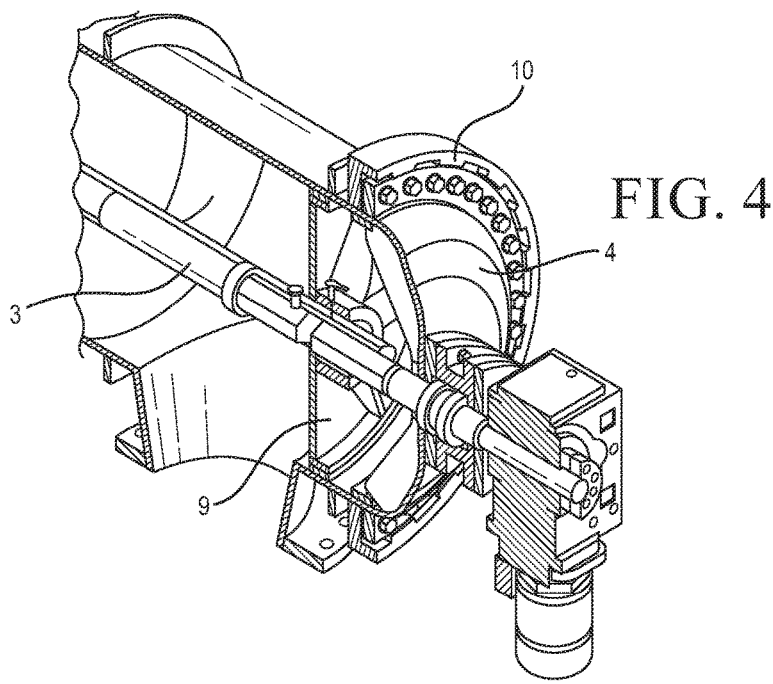
FIG. 4 shows a view similar to the one in FIG. 2, on a bigger scale, showing the system of closure of the cylindrical cavity, on the side of the motor area.

The structure, characteristics and advantages of the system of the invention will be better understood with the following description, made in reference to the realization examples shown in the enclosed drawings.

In FIG. 1 a system for the processing of solid waste and organic products is shown; this system is composed of, at least, one cylindrical cavity (1) which is closed in both bases and is equipped with a dragging spindle (2) whose axis (3) is supported by the lids (4 and 5) which close the cylindrical cavity (1) in its extreme sections. Out of the lid (4) partially sticks out the axis (3) for its connection to a motor mechanism (6). The axis (3) is supported by the lids (4 and 5) by means of bearings (7), FIGS. 2 and 3, from which the one situated next to the motor area (6) is closed by means of a magnetic plugging mechanism (8), of well-known structure, which spins around and together with the same axis and makes possible the blockage of the oiling of the corresponding bearing. Inside the cylindrical cavity (1) and near the motor area of the system, it is arranged a transverse partition wall (9), which serves as a means of isolating and protecting the motor area of the product or waste which is under treatment, avoiding contact between the mechanical parts and the product.

The base (4) which closes the cylindrical cavity on the side of the motor area includes, besides, a security system (10) by means of spinning wedges, of well-known structure in itself, according to what can be better appreciated in the detail of FIG. 4.

According to what can be appreciated in FIG. 1, in the axis (3) of the spindle (2) there are installed mixing blades (11), which are situated in the consecutive steps of the helix of the dragging spindle (2) and present an opposite curvature to that one of the helix of the dragging spindle (2), conforming a mixing helix with a direction of advance opposite to that one of the helix of the dragging spindle (2).

The cylindrical cavity (1) is equipped with a loading area (12) for the product to be treated, loading area which in the example represented in FIG. 1, is situated near the closing base (5) of the cavity (1) and a unloading area (13) for the exit of the treated product, unloading area which is situated near the closing base (4) of the cylindrical cavity.

The spindle (2) spins with a direction of advance from the loading area (12) to the unloading area (13) whereas the mixing blades (11) do it in the opposite direction.

The cylindrical cavity (1) is also equipped with an entrance (14) and an exit (15) for vapour. Finally, the cylindrical cavity (1) will be arranged with mechanisms of control of vapour, vapour which is injected through the entrance (14) of vapour.

Figure 5:
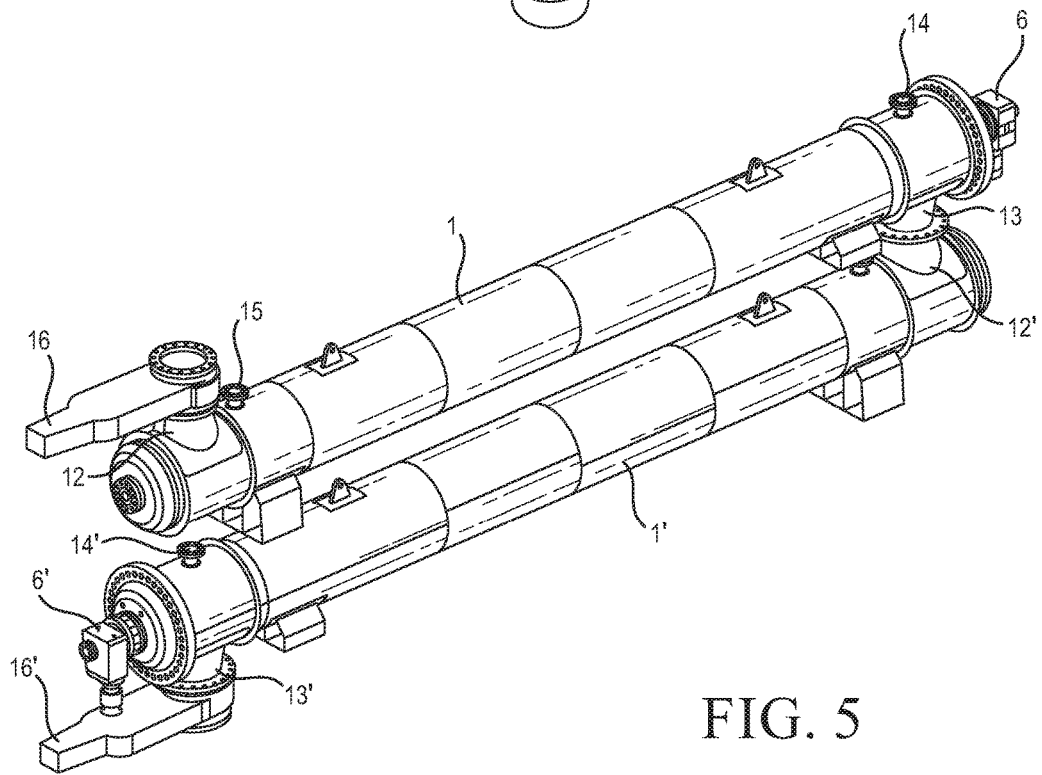
FIG. 5 shows a possible composition of the system, by means of two cylindrical cavities connected in series.

Preferably the system will be composed of two cylindrical cavities (1 and 1'), superimposed, as it is shown in FIG. 5, with the unloading area (13) of the cavity (1) connected to the loading area (12') of the cavity (1'). In the loading area (12) of the cavity (1) and in the unloading area (13') of the cavity (1') guillotine valves or a gate blade (16-16') can be installed. To the entrance of vapour (14) a mechanism of supply of saturated vapour will be connected.

Figure 6:
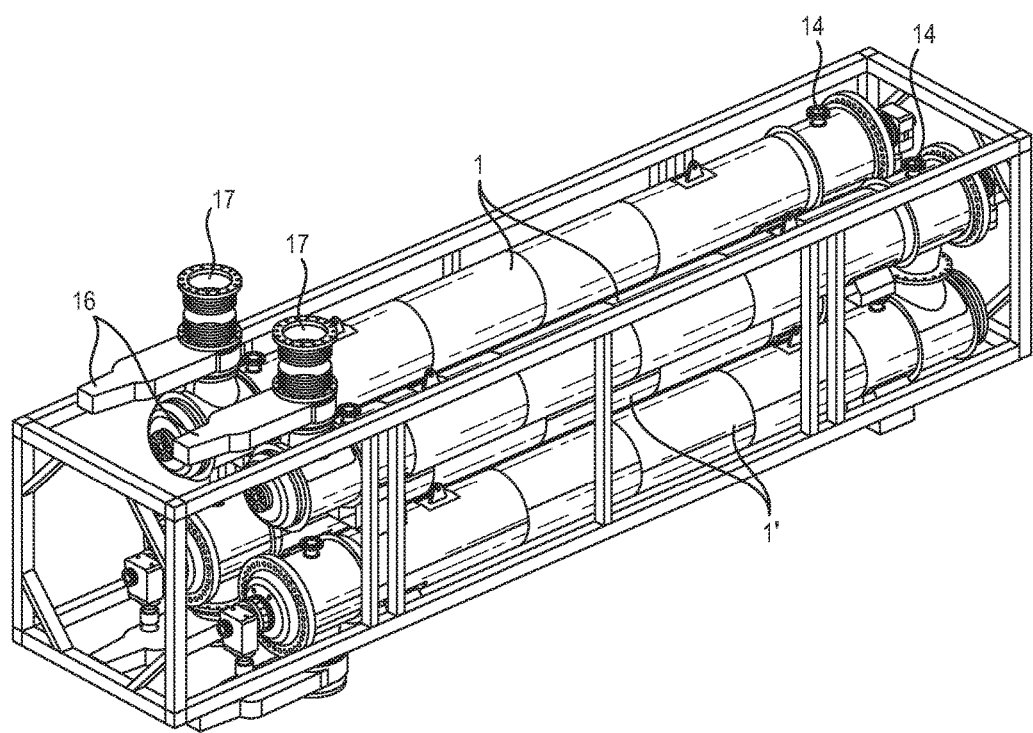
FIG. 6 shows in perspective a possible disposition in battery composed of eight cylindrical cavities of treatment.

In FIG. 6 it is shown a system composed of four cylindrical cavities which are superimposed, connected in series of two and arranged in a container (17), which facilitates its transport and installation and even the extension of the system by means of the superimposition of two or more containers with connection in series of superimposed cavities by means of flexible junctions (18).

Figure 7:
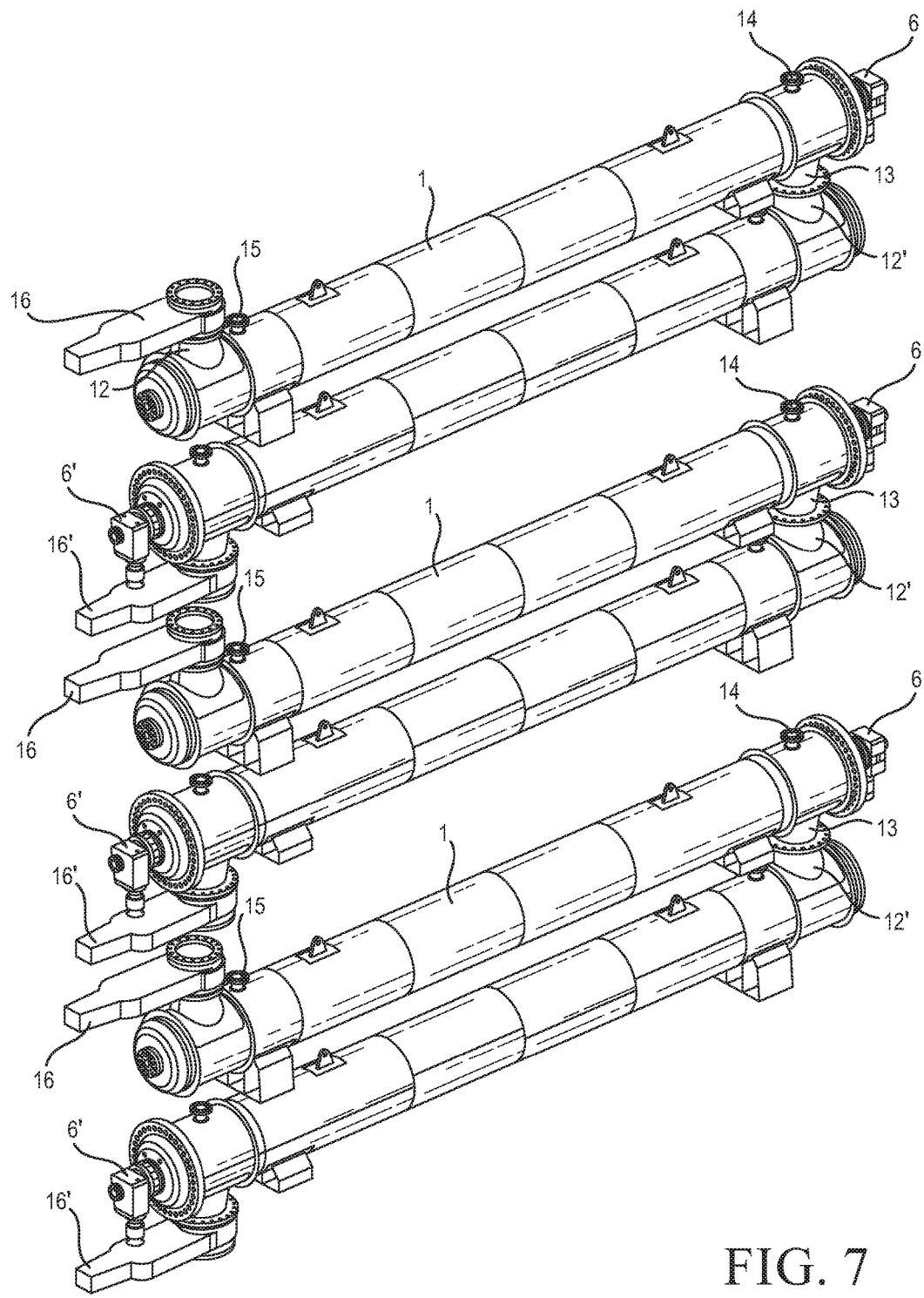
FIG. 7 shows in perspective another possible composition of the system of the invention, by means of a series of cylindrical cavities connected in series and arranged on a high level.

Finally, in FIG. 7 it is shown a disposition in a high level, in which the system is composed of a number of superimposed cavities which are connected consecutively in series, including after each two superimposed cavities a disposition equal to that described in reference to the FIG. (5).

In the different dispositions, in each pair of superimposed cavities (1 and 1') the same references have been used with the apostrophe in the references of the cavity (1').

The system of the invention, starting from the disposition in FIG. 5 or 6, can be extended in a modular way, depending on the volume of the product to be treated.

Preferably, the helix of the dragging spindle (2) will be of a slightly smaller diameter than the internal one of the cylindrical cavity (1), so that between both edges a void space is formed; a space which will be occupied by the waste to be treated, in a way that direct friction between the waste that the spindle (2) drags and the internal surface of the cavity (1), is removed.

The system of the invention, due to its structure, can work in continuum, by means of the constant load of material through each loading area (12, 12' . . . ) in each cavity (1, 1' . . . ), as treated product is unloaded through the unloading areas (13, 13' . . . ). As it can be seen in the different dispositions shown in the drawings, the cylindrical cavities will be preferably arranged in horizontal position.

The invention claimed is:

1. A system for processing organic waste or products, the system comprising:
    a housing defining a horizontal cylindrical cavity mounted horizontally between a first base and a second base;
    a loading area adapted to allow the organic waste or products to be introduced into said horizontal cylindrical cavity, said loading area positioned adjacent to said first base;
    an unloading area adapted to allow the processed organic waste or products to exit said horizontal cylindrical cavity, said unloading area positioned adjacent said second base;
    an entrance adapted to allow a feeding of saturated water vapor into said horizontal cylindrical cavity, said entrance positioned adjacent said unloading area;
    a vapor exit on said housing positioned adjacent said loading area, said vapor exit adapted to allow the water vapor to exit said horizontal cylindrical cavity;
    a dragging spindle extending longitudinally and axially within said horizontal cylindrical cavity, said dragging spindle having a single continuous helix extending from said loading area to said unloading area with multiple steps in which the multiple steps are spaced from each other, each of said multiple steps of said continuous helix having a curvature along said dragging spindle, said dragging spindle and said continuous helix having a direction of advance of the organic waste or products from said loading area to said unloading area, said continuous helix of said dragging spindle having a diameter less than an internal diameter of said cylindrical cavity so as to define a separating void space between outermost edges of said continuous helix and the internal diameter of said cylindrical cavity;

a plurality of mixing blades affixed to said dragging spindle on a common axis with said continuous helix, said plurality of mixing blades radiating outwardly of said dragging spindle, said plurality of mixing blades respectively fixedly positioned adjacent to the multiple steps of said continuous helix and spaced so as to be separate from an adjacent step of the multiple steps of said continuous helix, said plurality of mixing blades having a helical curvature opposite to the curvature of the multiple steps of said continuous helix; and a motor mechanism connected to an axis of said dragging spindle.

2. The system of claim 1, wherein each of said plurality of mixing blades has a diameter less than a diameter of each of said continuous helix.

3. The system of claim 1, wherein said cylindrical cavity comprises at least two cylindrical cavities connected in series by the respective loading and unloading areas.

4. The system of claim 1, wherein said cylindrical cavity has a transverse partition wall that isolates said motor mechanism from the organic waste or products within said cylindrical cavity.

\* \* \* \* \*